United States Patent
Matsuda

(10) Patent No.: US 9,591,178 B2
(45) Date of Patent: Mar. 7, 2017

(54) DETERMINATION OF SCAN RESOLUTION BASED ON INFORMATION INCLUDED IN SCAN REQUEST

(71) Applicant: BROTHER KOGYO KABUSHIKI KAISHA, Nagoya-shi, Aichi-ken (JP)

(72) Inventor: Munehisa Matsuda, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/753,161

(22) Filed: Jun. 29, 2015

(65) Prior Publication Data

US 2015/0381853 A1  Dec. 31, 2015

(30) Foreign Application Priority Data

Jun. 30, 2014 (JP) ................... 2014-134704

(51) Int. Cl.
H04N 1/40 (2006.01)
H04N 1/00 (2006.01)

(52) U.S. Cl.
CPC ..... *H04N 1/40068* (2013.01); *H04N 1/00204* (2013.01); *H04N 1/00217* (2013.01); *H04N 1/00822* (2013.01); *H04N 1/00938* (2013.01); *H04N 2201/0081* (2013.01); *H04N 2201/0093* (2013.01); *H04N 2201/0094* (2013.01)

(58) Field of Classification Search
CPC .................................................. H04N 1/40068
USPC ....................................................... 358/1.15
See application file for complete search history.

(56) References Cited

U.S. PATENT DOCUMENTS

| 2011/0239123 A1* | 9/2011 | Tsujimoto | H04L 63/08 715/740 |
| 2012/0226990 A1* | 9/2012 | Nakashima | H04N 1/00222 715/738 |
| 2012/0250081 A1* | 10/2012 | Takahashi | G06K 15/02 358/1.15 |
| 2013/0235421 A1* | 9/2013 | Ono | H04N 1/0023 358/1.15 |

FOREIGN PATENT DOCUMENTS

| JP | 11-289416 A | 10/1999 |
| JP | 2003-179719 A | 6/2003 |
| JP | 2005-341419 A | 12/2005 |
| JP | 2006-197325 A | 7/2006 |

* cited by examiner

*Primary Examiner* — Jacky X Zheng
(74) *Attorney, Agent, or Firm* — Merchant & Gould P.C.

(57) ABSTRACT

One scanner taught in the present specification may be provided with a processor and a memory that stores computer-readable instructions. The computer-readable instructions, when executed by the processor, may cause the scanner to perform: obtaining a scan request from a terminal device; determining a target scan resolution based on software-related information included in the scan request; generating scan image data having the target scan resolution; and supplying the scan image data to the terminal device. The software-related information is information relating to a software installed in the terminal device and used by the terminal device for supplying the scan request to the scanner.

14 Claims, 3 Drawing Sheets

FIG. 2

Scan Request SR

Header Portion HP:
```
POST /Scan Jobs HTTP/1.1    ← 110
Host: 192.168.13.7:8080    ← 112
Content-Type: application/x-www-form-urlencoded
Connection: keep-alive
Accept: */*
User-Agent: ApplA1 (OSXX2.0, HardH1)    ← 114
Accept-Language: en-us
Accept-Encoding: gzip, deflate
Content-Length: sss
```

Body Portion BP:
```
<?xml version="1.0" encoding="UTF-8" standalone="no"?>    ← 120
<Scan: Scansettings xmlns: Scan="http://xxx">
<Scan: Version>2.0</Scan: Version>
<Scan: DocumentFormat>image/jpeg</Scan: DocumentFormat>    ← 122
<Scan: Intents>Document</Scan: Intents>    ← 124
<Scan: XResolution>300</Scan: XResolution>    ← 126
<Scan: YResolution>300</Scan: YResolution>    ← 128
<Scan: ColorMode>RGB24</Scan: ColorMode>    ← 130
</Scan: Scansettings>
```

DETERMINATION OF SCAN RESOLUTION BASED ON INFORMATION INCLUDED IN SCAN REQUEST

CROSS-REFERENCE TO RELATED APPLICATIONS

This application claims priority to Japanese Patent Application No. 2014-134704, filed on Jun. 30, 2014, the contents of which are hereby incorporated by reference into the present application.

TECHNICAL FIELD

The present specification discloses a scanner that obtains a scan request from a terminal device, and supplies scan image data to the terminal device.

DESCRIPTION OF RELATED ART

A technique for sending image data having a resolution corresponding to a destination of scan image data is known. For example, as a known technique, an image information device sends image data having a resolution corresponding to an output condition of a receiving-side facsimile device. The output condition is either inputted beforehand by a user, or is obtained from the receiving side facsimile device. Furthermore, for example, as a known technique, a facsimile device allows designation of a resolution within a range of a facsimile communication when a destination apparatus is a facsimile communication apparatus, and allows designation of a resolution within a range that includes the highest resolution of the facsimile device when the destination apparatus is a computer apparatus. Furthermore, for example, as a known technique, a scanner device sends low-resolution image data to a host computer, and sends high-resolution image data to either a file server device or a printer. Furthermore, for example, as a known technique, a multifunction apparatus obtains from a storage server information that indicates a resolution corresponding to a directory to which image data is to be saved, and sends image data having the resolution to the storage server.

SUMMARY

As described above, various methods for sending image data having a resolution corresponding to a destination of scan image data are known. In this specification, a technique is provided with which scan image data having an appropriate scan resolution corresponding to a terminal device may be supplied to the terminal device by using a novel method.

A scanner taught in the present specification may comprise a processor and a memory that stores computer-readable instructions. The computer-readable instructions, when executed by the processor, may cause the scanner to perform: obtaining a scan request from a terminal device; determining a target scan resolution based on software-related information included in the scan request, the software-related information being information relating to a software installed in the terminal device, and the software being used by the terminal device for supplying the scan request to the scanner; generating scan image data having the target scan resolution; and supplying the scan image data to the terminal device.

Another scanner taught in the present specification may comprise a processor and a memory that stores computer-readable instructions. The computer-readable instructions, when executed by the processor, may cause the scanner to perform: obtaining a scan request from a terminal device in accordance with a HTTP (abbreviation of Hyper Text Transfer Protocol); determining a target scan resolution based on information described in a User-Agent area within the scan request; generating scan image data having the target scan resolution; and supplying the scan image data to the terminal device.

A control method and computer-readable instructions for implementation of the scanner described above, and a non-transitory computer-readable recording medium in which the computer-readable instructions are stored, are also novel and useful. Furthermore a system comprising the scanner and the terminal device is also novel and useful.

BRIEF DESCRIPTION OF DRAWINGS

FIG. 2 shows an example of a scan request; and

EMBODIMENTS (Configuration of Communication System CS; FIG. 1)

As shown in FIG. 1, a communication system CS comprises a terminal device TE and a scanner SC that is a peripheral device of the terminal device TE. The terminal device TE and the scanner SC can communicate with one another via a network (i.e., either a wired LAN or a wireless LAN).

(Configuration of Scanner SC)

Figure 1:
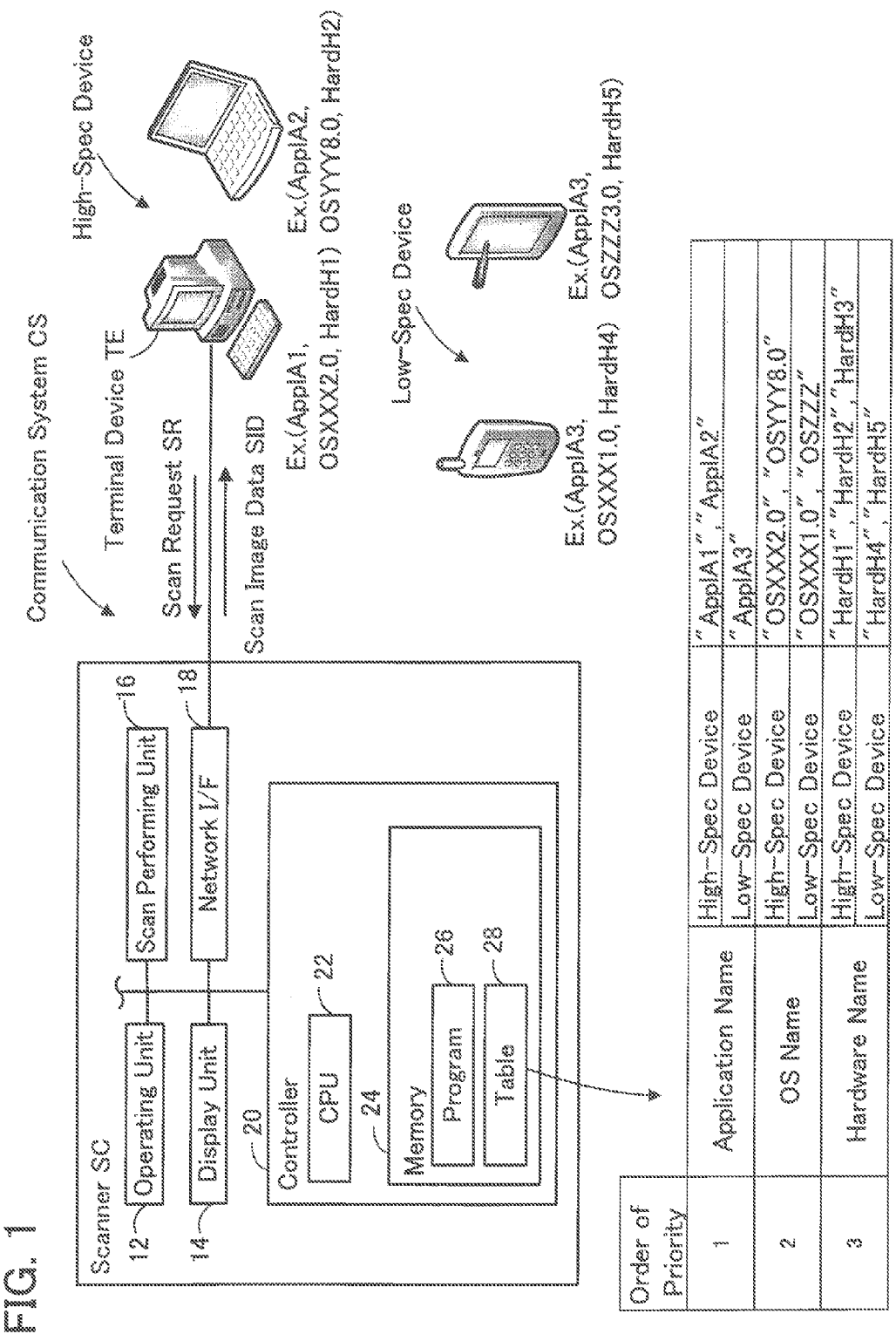
FIG. 1 shows the configuration of a communication system.

The scanner SC can perform a so-called pull-type scan function, and the terminal device TE can obtain scan image data SID from the scanner SC by supplying a scan request SR to the scanner SC.

The scanner SC comprises an operating unit 12, a display unit 14, a scan performing unit 16, a network interface 18, and a controller 20. These components 12, 14, etc. are connected to one another via a bus line. The operating unit 12 is configured by a plurality of keys. A user can input various instructions to the scanner SC by operating the operating unit 12. The display unit 14 is a display for displaying various information. The scan performing unit 16 comprises scan mechanism, of which, for example, CCD (abbreviation of a charge coupled device CCD) type or CSI (abbreviation of a contact image sensor) type. The network interface 18 is connected with either a wired LAN or a wireless LAN.

The controller 20 comprises a CPU 22 and a memory 24. The CPU 22 is a processor for executing various processes (for example, a processing of FIG. 3, which will be described below) in accordance with a program 26 stored in the memory 24. In addition to the program 26, the memory 24 stores a table 28 for identifying a specification of the terminal device TE that is the supply source of a scan request SR. Specifically, an application name, an OS (abbreviation of operating system) name, and a hardware name are registered in the table 28 so as to distinguish between a high-spec device and a low-spec device. A high-spec device is a device such as a desktop PC or a notebook PC that comprises relatively high-spec resources. In other words, a high-spec device comprises a CPU having relatively high processing capabilities, and a memory having a relatively large capacity. Furthermore, a high-spec device normally comprises a display unit (i.e., a display) of a relatively large size. Alternatively, a low-spec device is a device such as a tablet PC or smartphone that comprises relatively low-spec resources. In other words, a low-spec device comprises a CPU having relatively low processing capabilities, and a memory having a relatively small capacity. Furthermore, a low-spec device normally comprises a display unit of a relatively small size.

The application name is a name of an application program (simply called "application" hereinbelow) which may be installed in the terminal device TE. In particular, an application is a scanner driver program used by the terminal device TE for supplying a scan request SR to the scanner SC. For example, the application is provided by a vendor of the scanner SC, and is either stored on a medium that is shipped together with the scanner SC, or stored in a server located on an internet by the vendor. The terminal device TE can install the application from either the medium or the server. Also, for example, the application may be provided by a business operator (for example, a vendor of an OS program or the like) that differs from the vendor of the scanner SC. In the present embodiment, an application name that does not include the version name of the application (for example, "ApplA1") is described in the table 28. However, in a modification, an application name that includes the version name (for example, "ApplA1ver. 2.0") may be described in the table 28.

The OS name is a name of an OS program (simply called "OS" hereinbelow) which may be installed in the terminal device TE. A scan request SR is supplied from the terminal device TE to the scanner SC in accordance with the OS and the application operating in a collaborative manner in the terminal device TE. Therefore, the OS is also a program used by the terminal device TE for supplying a scan request SR to the scanner SC. That is, the application and the OS are software used by the terminal device TE for supplying a scan request SR to the scanner SC. In the present embodiment, an OS name (for example, "OSXXX2.0") that includes a version name of the OS (for example, "2.0") is described in the table 28. However, in a modification, an OS name (for example, "OSXXX") that does not include a version name may be described in the table 28. Furthermore, in FIG. 1, the name of the existent OS is not given, but Windows NT (registered trademark), MacOS (registered trademark), or the like, for example, can be cited as OS names associated with a high-spec device. Also, iPhone (registered trademark) OS, Android (registered trademark), WindowsPhone (registered trademark) OS and the like, for example, can be cited as OS names associated with a low-spec device.

The hardware name is a name of hardware of the terminal device TE. The hardware name can also be expressed as, for example, the product name or model name of the terminal device TE. In FIG. 1, the name of the existent hardware is not given, but Macintosh (registered trademark), or the like, for example, can be cited as a hardware name associated with a high-spec device. Also, iPhone (registered trademark), NEXUS7 (registered trademark), Galaxy (registered trademark) and the like, for example, can be cited as hardware names associated with a low-spec device.

The vendor of the scanner SC prepares the table 28 in which various actually existing names are associated with either a high-spec device or a low-spec device, and causes the table 28 to be stored in the memory 24 beforehand. Specifically, the vendor prepares the table 28 as follows. First, the vendor investigates beforehand the names of software (i.e., application names or OS names) that may be installed in a high-spec device such as a desktop PC or notebook PC, and the names of software that may be installed in a low-spec device such as a tablet PC or a smartphone. The vendor also investigates beforehand the hardware names of high-spec devices and low-spec devices. Then, based on the investigation results, the vendor prepares the table 28 by associating each software name and each hardware name with either a high-spec device or a low-spec device.

(Content of Scan Request SR; FIG. 2)

FIG. 2 shows an example of a scan request SR supplied from the terminal device TE to the scanner SC. The scan request SR is a request for causing the scanner SC to perform a scan, and is a POST request according to HTTP (abbreviation of Hypertext Transfer Protocol). The scan request SR includes a header portion HP and a body portion BP.

The header portion HP includes a plurality of areas 110 to 114 etc. An area 110 is the first (i.e. head) area in the header portion HP, and a character string indicating that the scan request SR is a POST request according to HTTP is described in this area 110. A character string indicating the IP address "192.168.13.7" which is the supply destination of the scan request SR and the port number "8080" of the scanner SC is described in an area 112.

An area 114 is a User-Agent area, information related to the terminal device TE which is the supply source of the scan request SR is described in this User-Agent area 114. Specifically, a character string indicating, for example, the names of the software (i.e., the application and/or OS name) installed in the terminal device TE and the hardware name of the terminal device TE, may be described in the User-Agent area 114. The type of information described in the User-Agent area 114 depends on the software installed in the terminal device TE. In the example of FIG. 2, the application name "ApplA1", the OS name "OSXXX2.0", and the hardware name "HardH1" are described in the User-Agent area 114. However, there is a possibility that only one or two names from among the application name, the OS name, and the hardware name are described in the User-Agent area of the scan request supplied from another terminal device. Also, there is a possibility that other information (e.g., the name of a browser program installed in the terminal device TE) is described in the User-Agent area 114 without describing any of these names. Furthermore, other areas within the header portion HP (e.g., Content-Type and so forth) are not particularly related to the technique of the present embodiment, and as such, explanations of these areas will be omitted.

The body portion BP includes a plurality of areas 120 to 130 etc. An area 120 is the first (i.e. head) area of the body portion BP, and a character string indicating that the body portion BP is configured according to XML (abbreviation of Extensible Markup Language) version 1.0 is described in this area 120. In areas 122 to 130, characters strings indicating scan conditions designated by a user in a scan condition designation screen displayed in accordance with an application of the terminal device TE are described.

In the area 122, a character string indicating a data format (JPEG (abbreviation of Joint Photographic Experts Group) in the example of FIG. 2) of scan image data SID to be supplied to the terminal device TE is described. For example, Portable Document Format (PDF), Tagged Image File Format (TIFF) and the like can be cited as data formats other than JPEG. In the area 122, one character string designated by the user among a plurality of character strings (i.e., JPEG, PDF, TIFF, etc.) indicating a plurality of data formats is described.

An area 124 is an Intents area, and a character string indicating a type of image (Document in the example of FIG. 2) in an original document of scan target can be described in this Intents area. The types of images in an original document are classified as Document, TextandGraphic, and Photo. Document signifies an image that includes only text. TextandGraphic signifies an image that includes both text and graphics (or a photograph). Photo signifies an image that includes only a photograph. In the area 124, rather than the type of image, Preview can be described. Preview signifies that the scan image data is used for preview. In other words, Preview signifies that the scan image date SID is displayed on a display unit of the terminal device TE for in-advance confirmation before a main scan of the original document is performed. In the area 124, One character string designated by the user among the plurality of character strings (i.e., Document, Preview, and so forth) indicating the type of image in the original document and preview is described.

In the areas 126 and 128, character strings (300 in the example of FIG. 2) indicating scan resolutions in an X direction (e.g., main scanning direction) and a Y direction (e.g., sub scanning direction) are described. In the present embodiment, the scanner SC generates scan image data SID having the same scan resolution in the X direction and the Y direction. Therefore, the same value is described in each of areas 126 and 128. However, in a modification, the value of the scan resolution for each of the X direction and the Y direction may differ, and as a result, a different value may be described in each of the areas 126 and 128. Furthermore, in the present embodiment, the highest scan resolution capable of being used by the scanner SC is 600 dpi. In addition, the scanner SC is capable of using each of the scan resolutions 300 dpi, 150 dpi, and 100 dpi. In each of the areas 126 and the area 128, one character string designated by the user among four character strings (i.e., 600 dpi, 300 dpi, 150 dpi, and 100 dpi) indicating the four scan resolutions is described. When a specific value for the scan resolution is not designated by the user, that is, when AUTO is designated by the user, a character string indicating AUTO is described in each of the areas 126 and 128. In this case, as will be described in detail below, the scanner SC automatically determines the scan resolution (NO in S20 of FIG. 3, and S30 to S52).

In an area 130, a character string (RGB24 in the example of FIG. 2) indicating the color expression format of the scan image data SID is described. RGB24 signifies that each of the values of R, G, and B in the RGB color space is represented using eight bits (i.e., 256 gradations). In addition, for example, RGB48 in which 16 bits are allocated to each of R, G, and B, and RGB18 in which six bits are allocated to each of R, G, and B, and so forth can also be cited as the color expression format. In addition, for example, Grayscale8 in which eight bits are allocated to a luminosity Y value, and CMYK32 in which eight bits are allocated to each of C, M, Y, and K, and so forth can also be cited as the color expression format. In the area 130, one character string designated by the user from among a plurality of character strings (i.e., RGB24, RGB48, etc.) indicating a plurality of color expression formats is described. The other areas in the body portion BP are not really related to the technique of the present embodiment, and as such, explanations of these areas will be omitted.

(Process Performed by Terminal Device TE)

Next, the contents of process performed by the terminal device TE will be explained. When the application is started by the user, the CPU (not shown in the drawings) of the terminal device TE causes the display unit (not shown in the drawings) of the terminal device TE to display a scan condition designation screen according to the OS and the application. The scan condition designation screen is a screen for causing the user to designate scan conditions, which include the data format, the type of image in the original document (or a preview), the scan resolution (or AUTO), and the color expression format. The CPU generates a scan request SR according to the OS and the application when the scan conditions are designated by the user in the scan condition designation screen, and thereafter, a scan performing button is selected by the user. Specifically, the CPU describes information related to the terminal device TE (e.g., the application name, the OS name, the hardware name, and so forth) in the User-Agent area 114 of the header portion HP. The CPU also describes respective character strings indicating the designated scan conditions in the respective areas 122 to 130 of the body portion BP. Then, the CPU supplies the scan request SR to the scanner SC according to the OS and the application.

Figure 3:
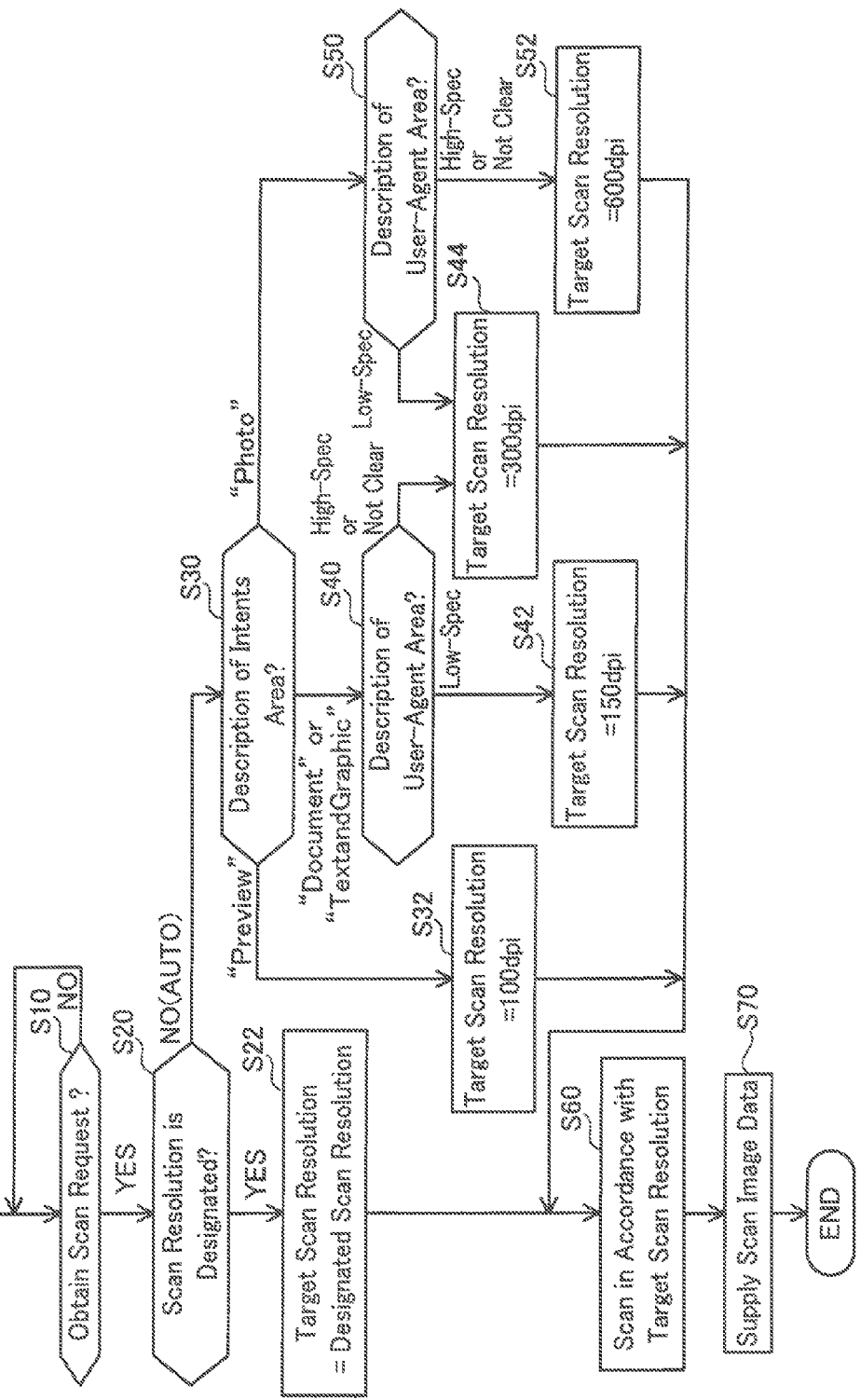
FIG. 3 shows a flowchart of processing performed by a scanner.

(Process Performed by Scanner SC; FIG. 3)

FIG. 3 shows a flowchart of process performed by the CPU 22 of the scanner SC. In S10, the CPU 22 monitors obtaining a scan request SR from the terminal device TE. The CPU 22 determines YES in S10 when the scan request SR is received via the network interface 18, and proceeds to S20.

In S20, the CPU 22 determines whether or not the scan resolution has been designated based on information described in areas 126 and 128 included in the body portion BP of the scan request SR (refer to FIG. 2). Specifically, when a character string indicating a specific value (e.g., 300 or the like) is described in each of areas 126 and 128, the CPU 22 determines that the scan resolution has been designated (YES in S20), and in S22 determines the value described in each of areas 126 and 128 as a target scan resolution. The target scan resolution is a resolution that the scan image data generated in S60 (described below) should have. When S22 ends, the CPU 22 proceeds to S60. Alternatively, when a character string indicating AUTO is described in each of the areas 126 and 128, the CPU 22 determines that the scan resolution is not designated (NO in S20), and proceeds to S30.

In S30, the CPU 22 checks information described in an Intents area 124 (refer to FIG. 2) included in the body portion BP of the scan request SR. When a character string indicating Preview is described in the Intents area 124 ("Preview" in S30), in S32, the CPU 22 determines 100 dpi as the target scan resolution. That is, in S32, the CPU 22 determines 100 dpi as the target scan resolution regardless of the information described in the User-Agent area 114 (refer to FIG. 2) included in the header portion HP of the scan request SR, that is, regardless of the specifications (i.e. spec) of the terminal device TE. When S32 ends, the CPU 22 proceeds to S60.

When a character string indicating either Document or TextandGraphic is described in the Intents area 124 ("Document" or "TextandGraphic" in S30), in S40, the CPU 22 uses the information described in the User-Agent area 114 and the table 28 in the memory 24 (refer to FIG. 1) to identify the spec of the terminal device TE. Specifically, the CPU 22 identifies the spec of the terminal device TE as follows.

First, the CPU 22 determines whether or not any application name in the table 28 is described in the area 114. When an application name (for example, ApplA1) associated with a high-spec device is described in the area 114, the CPU 22 identifies the terminal device TE as high-spec, and when an application name (for example, ApplA3) associated with a low-spec device is described in the area 114, the CPU 22 identifies the terminal device TE as low-spec. Furthermore, when none of the application names in the table 28 is described in the area 114, the CPU 22 determines whether or not any of the OS names in the table 28 are described in the area 114. When an OS name (for example, OSXXX2.0) associated with a high-spec device is described in the area 114, the CPU 22 identifies the terminal device TE as high-spec, and when an OS name (for example, OSXXX1.0) associated with a low-spec device is described in the area 114, the CPU 22 identifies the terminal device TE as low-spec. Furthermore, when none of the OS names in the table 28 is described in the area 114, the CPU 22 determines whether or not any of the hardware names in the table 28 are described in the area 114. When a hardware name (for example, HardH1) associated with a high-spec device is described in the area 114, the CPU 22 identifies the terminal device TE as high-spec, and when a hardware name (for example, HardH4) associated with a low-spec device is described in the area 114, the CPU 22 identifies the terminal device TE as low-spec. When none of the hardware names in the table 28 is described in the area 114, that is, when none of the names in the table 28 is described in the area 114, the CPU 22 identifies the spec of the terminal device TE as being not clear.

As described hereinabove, the CPU 22 identifies the spec of the terminal device TE by using the information in the table 28 in the order of the application name, the OS name, and the hardware name. That is, priority level of the application name is the highest, priority level of the OS name is the next highest, and priority level of the hardware name is the lowest. The reason for this is as follows. There is a high possibility that the application for the scanner SC is provided by the vendor of the scanner SC. That is, the vendor normally develops applications for high-spec devices like a desktop PC and applications for low-spec devices like a smartphone respectively, and provides these applications to the user of the terminal device TE. In this case, since each of the application names are determined by the vendor, the spec of the terminal device TE can be extremely accurately identified from each of the application names. Therefore, priority level of the application name is the highest. Also, since various generally known OSs are classified into OSs for high-spec devices (for example, Windows 7 (registered trademark) and OSs for low-spec devices (for example, Android (registered trademark), the spec of the terminal device TE can also be accurately identified from the OS name. Therefore, priority level of the OS name is relatively high. That is, generally speaking, it is possible to accurately identify the spec of the terminal device TE based on the names of the software (i.e., the application name and/or the OS name) installed in the terminal device TE. Therefore, in the present embodiment, priority level of the application name and the OS name is high, and consequently, the scanner SC is able to appropriately identify the spec of the terminal device TE based on these names. Alternatively, since huge numbers of hardware are being marketed and various new hardware will be marketed in the future, it is impossible for the vendor of the scanner SC to know all of the hardware names. Therefore, the spec of the terminal device TE cannot be accurately identified based on the hardware name compared to the case based on the software name. Therefore, priority level of the hardware name is low.

When the terminal device TE is identifies as low-spec (low-spec in S40), in S42, the CPU 22 determines 150 dpi as the target scan resolution. Alternatively, When the terminal device TE is identifies as high-spec (high-spec in S40), or when the specifications of the terminal device TE are not clear (not clear in S40), in S44, the CPU 22 determines 300 dpi as the target scan resolution. When either S42 or S44 ends, the CPU 22 proceeds to S60.

Furthermore, when a character string indicating Photo is described in the Intents area 124 ("Photo" in S30), in S50, the CPU 22 identifies the specifications of the terminal device TE in accordance with the same method as S40. Then, when the terminal device TE is identified as low-spec (low-spec in S50), in S44, the CPU 22 determines 300 dpi as the target scan resolution. Alternatively, when the terminal device TE is identified as high-spec (high-spec in S50), or when the specifications of the terminal device TE are not clear (S50: not clear), in S52, the CPU 22 determines 600 dpi, which is the highest scan resolution that the scanner SC is capable of using, as the target scan resolution. When either S44 of S52 has ended, the CPU 22 proceeds to S60.

In S60, the CPU 22 causes the scan performing unit 16 (refer to FIG. 1) to perform a scan of the original document, and generates scan image data SID having the target scan resolution determined in S22, S32, S42, S44, or S52. Specifically, the CPU 22 instructs the scan performing unit 16 to perform a scan of the original document at an optical resolution that matches the target scan resolution, and uses a scan result obtained from the scan performing unit 16 to generate scan image data SID having the target scan resolution. However, in a modification, the CPU 22 may instruct the scan performing unit 16 to perform a scan of the original document at an optical resolution that matches the highest scan resolution (i.e., 600 dpi) that the scanner SC is capable of using. In this case, when the target scan resolution (e.g., 300 dpi) is lower than the optical resolution, the CPU 22 generates intermediate image data having a resolution (i.e., 600 dpi) that matches the optical resolution, next, performs a resolution conversion on the intermediate image data, and generates scan image data SID having the target scan resolution (e.g., 300 dpi). The CPU 22 also generates the scan image data SID in accordance with information described in the area 122 and the area 130 included in the body portion BP of the scan request SR. Specifically, the CPU 22 generates the scan image data SID having the data format (e.g., JPEG) described in the area 122, and the color expression format (e.g., RGB24) described in the area 130.

Next, in S70, the CPU 22 supplies the scan image data SID generated in S60 to the terminal device TE. Herewith, the scan image data SID is used in the terminal device TE. For example, a scan image (i.e., an image in the original document) represented by the scan image data SID is displayed. Also, for example, when an application for manipulating scan image data SID is installed in the terminal device TE, the scan image data SID is manipulated by the user.

(Reasons for Determining Different Scan Resolution)

As described hereinabove, in S32, S42, S44, and S52, different scan resolutions are determined as the target scan resolution. The reason for this will be explained below. When S32 is performed, the user of the terminal device TE wants to confirm the scan image in advance before performing the main scan of the original document. Therefore, since the terminal device TE does not need the scan image data SID having a relatively high scan resolution, in S32, the relatively low scan resolution of 100 dpi is determined as the target scan resolution. Consequently, the data size of the scan image data SID can be minimized. As a result, it is possible to reduce the processing load when the scan image data SID is generated, the communication load between the scanner SC and the terminal device TE, the load on the memory (not shown in drawing) inside the terminal device TE, and the processing load when terminal device TE uses (e.g., displays) the scan image data SID. Hereinbelow, these loads are simply called "loads of scanner SC and terminal device TE".

Alternatively, when S42, S44, or S52 is performed, what the user of the terminal device TE wants is the performance of the main scan, not the in-advance confirmation of the scan image. Therefore, in S42, S44, or S52, a higher scan resolution (i.e., 150 dpi, 300 dpi, or 600 dpi) than the 100 dpi of S32 is determined as the target scan resolution. This makes it possible to provide the user with scan image data SID having a relatively high scan resolution, that is, high-quality scan image data SID.

Furthermore, in S42, S44, or S52, the target scan resolution corresponding to the type of the image in the original document of the scan target is determined. The user normally wants high-quality scan image data to be generated for an original document that includes only a photograph (i.e., Photo). Therefore, a relatively high scan resolution is determined as the target scan resolution for the original document that includes only the photograph (S44 via S50, or S52). This makes it possible to provide the user with high-quality scan image data SID. Alternatively, the user normally does not want such high-quality scan image data to be generated for an original document that includes text (i.e., Document or TextandGraphic). Therefore, a relatively low scan resolution is determined as the target scan resolution for the original document that includes the text (S42, or S44 via S40). This makes it possible to reduce the scanner SC and terminal device TE loads. Furthermore, when an original document that includes text is scanned, there is the possibility of a plurality of original documents being scanned. In this case, when scan image data having a relatively high scan resolution is generated, the data size of the scan image data increases. In the present embodiment, since a relatively low scan resolution is determined as the target scan resolution for the original document that includes the text, the increase in the data size of the scan image data can be appropriately suppressed even when a plurality of original documents is scanned.

Furthermore, in S42, S44, or S52, the target scan resolution corresponding to the spec of the terminal device TE is determined even when the type of the image in the original document is the same. A high-spec device is normally provided with a relatively large display unit. Therefore, hypothetically, when scan image data having a relatively low scan resolution is generated in a case where the terminal device TE is high-spec, the user easily perceives the scan image data as being low quality. To avoid this, in a case where the terminal device TE is high-spec, a relatively high scan resolution is determined as the target scan resolution (S44 via S40, or S52). This makes it possible to suppress the perception of the user that the scan image data is low quality. In particular, a high-spec device comprises a CPU having relatively high processing capabilities, and a memory having a relatively large capacity. Therefore, it is possible to suppress a large load on the CPU and the memory even when a high-spec terminal device TE obtains the scan image data having a data size that is relatively large. Alternatively, a low-spec device comprises a CPU having relatively low processing capabilities, and a memory having a relatively small capacity. Therefore, when the scan image data having a relatively high scan resolution, that is, the scan image data having a data size that is relatively large is generated in a case where the terminal device TE is low-spec, a large load is taken on the CPU and memory of the terminal device TE. To avoid this, when the terminal device TE is low-spec, a relatively low scan resolution is determined as the target scan resolution (S42 via S40, or S44 via S50). This makes it possible to suppress a large load on the CPU and the memory of the terminal device TE. In particular, a low-spec device is normally provided with a relatively small display unit. Therefore, it is difficult for the user to perceive the scan image data as being low quality even when the scan image data having a relatively low scan resolution is generated. Thus, it is possible to suppress the perception of the user that the scan image data is low quality, and to reduce loads of the scanner SC and terminal device TE.

In the present embodiment, when the spec of the terminal device TE is determined as being not clear, in the same as a high-spec device, a relatively high scan resolution is determined as the target scan resolution (S44 via S40, or S52). This makes it possible to appropriately suppress the perception of the user that the scan image data is low quality when the spec of the terminal device TE has been determined as being not clear in a case where the terminal device TE is high-spec.

As described hereinabove, according to the present embodiment, the scanner SC can determine an appropriate target scan resolution corresponding to the spec of the terminal device TE based on information (i.e., application name, OS name, hardware name) described in the User-Agent area 114 of the scan request SR obtained from the terminal device TE. Therefore, the scanner SC is able to supply the terminal device TE with the scan image data SID having an appropriate target scan resolution.

(Correspondence Relationship)

The software names (i.e., the application name and the OS name) and the hardware name described in the User-Agent area 114 of FIG. 2 are examples of "software-related information" and "hardware-related information", respectively. For example, the application name "ApplA1" and the application name "ApplA3" of FIG. 1 are examples of a "name of a first application program", and a "name of a second application program", respectively. Also, for example, the OS name "OSXXX2.0" and the OS name "OSXXX1.0" of FIG. 1 are examples of a "name of a first OS program" and a "name of a second OS program", respectively. The information described in the area 122 to the area 130 of FIG. 2 is examples of "scan condition-related information". Also, for example, an image including only a photograph (i.e., "Photo") and an image including text (i.e., "Document" or "TextandGraphic") are examples of a "first type of image" and a "second type of image", respectively.

(Modification 1)

The table 28 of FIG. 1 needs not include all of the application name, the OS name, and the hardware name. For example, the table 28 may include only the application name, in which case the application name is an example of "software-related information" and "information described in a User-Agent area". Also, for example, the table 28 may include only the OS name, in which case the OS name is an example of "software-related information" and "information described in a User-Agent area". Also, for example, the table 28 may include only the hardware name, in which case the hardware name is an example of "information described in a User-Agent area".

(Modification 2)

The scan request SR need not be a request according to the HTTP, and may be a request according to another communication protocol (e.g., an original protocol developed by the vendor of the scanner SC). In this case, the header portion HP of the scan request SR need not include the User-Agent area 114, and the name of the software installed in the terminal device TE may be described in any area of the scan request SR. Generally speaking, a "specific communication protocol" may be a different communication protocol from the HTTP, and in this case, it is enough that "software-related information" is included in the scan request.

(Modification 3)

In a case where a "specific communication protocol" is a different communication protocol from the HTTP, the body portion BP of the scan request SR need not include the Intents area 124. In this case, information indicating the type of image represented by the original document of the scan target may be included in any area of the scan request SR. That is, it is enough that "scan condition-related information" is included in the scan request.

(Modification 4)

In the terminal device TE, instead of the type of image represented by the original document being designated, scan conditions that include the quality of a scan image (e.g., high quality or normal quality) may be designated by the user. In this case, the scan request SR may include a character string indicating the user-designated quality. Then, the scanner SC may perform the following process instead of the process of S30 in FIG. 3. That is, when the scan request SR includes a character string indicating high quality, the scanner SC proceeds to S50, and when the scan request SR includes a character string indicating normal quality, the scanner SC proceeds to S40. In the present modification, a character string indicating the scan image quality is an example of "scan condition-related information".

(Modification 5)

The information described in the Intents area 124 of the scan request SR need not be used. In this case, the scanner SC need not perform the process of S30, S32, S40 and S42 of FIG. 3. That is, the scanner SC may use the information described in the User-Agent area 114 to determine the target scan resolution corresponding to the spec of the terminal device TE (S44 or S52 performed in accordance with the result of S50), and may determine the target scan resolution without using the scan condition-related information.

(Modification 6)

For example, the value of the scan resolution determined when the spec of the terminal device is determined as being "high-spec or not clear" in S40, and the value of the scan resolution determined when the spec of the terminal device is determined as being "low-spec" in S50 may be different values. In this case, the former value may be larger or smaller than the latter value.

(Modification 7)

In the embodiment described hereinabove, the various processes of FIG. 3 are realized by the CPU 22 of the scanner SC executing the program 26 in the memory 24. Instead, at least one of the processes in FIG. 3 may be realized using hardware, such as a logical circuit.

What is claimed is:

1. A scanner comprising:
    a processor; and
    a memory that stores computer-readable instructions therein, the computer-readable instructions, when executed by the processor, causing the scanner to perform:
    obtaining a scan request from a terminal device;
    after the scan request is obtained, judging whether or not the scan request includes a value indicating a specific resolution,
    if it is judged that the scan request includes the value indicating the specific resolution, determining the value indicating the specific resolution as a target scan resolution,
    if it is judged that the scan request does not include the value indicating the specific resolution, determining the target scan resolution based on software-related information included in the scan request, the software-related information including a name of a software installed in the terminal device, and the software being used by the terminal device for supplying the scan request to the scanner;
    generating scan image data having the determined target scan resolution by scanning a document optically; and
    supplying the scan image data to the terminal device.

2. The scanner as in claim 1, wherein
    the software-related information includes a name of an application program installed in the terminal device, the application program being used by the terminal device for supplying the scan request to the scanner, and
    the determining of the target scan resolution based on the software-related information includes:
    determining a first resolution as the target scan resolution if the software-related information includes a name of a first application program; and
    determining a second resolution lower than the first resolution as the target scan resolution if the software-related information includes a name of a second application program different from the first application program.

3. The scanner as in claim 1, wherein
    the software-related information includes a name of an OS (abbreviation of Operation System) program installed in the terminal device, the OS program being used by the terminal device for supplying the scan request to the scanner, and
    the determining of the target scan resolution based on the software-related information includes:
    determining a third resolution as the target scan resolution if the software-related information includes a name of a first OS program; and
    determining a forth resolution lower than the third resolution as the target scan resolution if the software-related information includes a name of a second OS program different from the first OS program.

4. The scanner as in claim 1, wherein
    the obtaining of the scan request is performed in accordance with a specific communication protocol, and
    the software-related information is described in a header portion within the scan request according to the specific communication protocol.

5. The scanner as in claim 4, wherein
    the specific communication protocol is a HTTP (abbreviation of Hyper Text Transfer Protocol), and
    the software-related information is described in a User-Agent area included in the header portion.

6. The scanner as in claim 1, wherein
    the determining of the target scan resolution based on the software-related information is performed further based on scan condition-related information included in the scan request, and
    the scan condition-related information is information relating to a scan condition designated by a user of the terminal device.

7. The scanner as in claim 6, wherein
the obtaining of the scan request is performed in accordance with a specific communication protocol, and
the scan condition related information is described in a body portion within the scan request according to the specific communication protocol.

8. The scanner as in claim 6, wherein
the determining of the target scan resolution based on the software-related information includes:
    determining a fifth resolution as the target scan resolution if the scan condition-related information indicates that an original as a scan target represents a first type of image; and
    determining a sixth resolution lower than the fifth resolution as the target scan resolution if the scan condition-related information indicates that the original represents a second type of image different from the first type of image.

9. The scanner as in claim 6, wherein
the determining of the target scan resolution based on the software-related information includes determining a predetermined scan resolution as the target scan resolution, regardless of the software-related information, if the scan condition-related information indicates that the scan image data is used for a preview.

10. A scanner comprising:
a processor; and
a memory that stores computer-readable instructions therein, the computer-readable instructions, when executed by the processor, causing the scanner to perform:
obtaining a scan request from a terminal device in accordance with a HTTP (abbreviation of Hyper Text Transfer Protocol);
after the scan request is obtained, judging whether or not the scan request includes a value indicating a specific resolution,
if it is judged that the scan request includes the value indicating the specific resolution, determining the value indicating the specific resolution as a target scan resolution,
if it is judged that the scan request does not include the value indicating the specific resolution, determining the target scan resolution based on information described in a User-Agent area within the scan request;
generating scan image data having the determined target scan resolution by scanning a document optically; and
supplying the scan image data to the terminal device.

11. The scanner as in claim 10, wherein
the determining of the target scan resolution based on the information described in the User Agent area is performed based on software-related information described in the User-Agent area, the software-related information being information relating to a software installed in the terminal device, and the software being used by the terminal device for supplying the scan request to the scanner.

12. The scanner as in claim 10, wherein
the determining of the target scan resolution based on the information described in the User-Agent area is performed based on hardware-related information described in the User-Agent area, the hardware-related information being information relating to a hardware of the terminal device.

13. A non-transitory computer-readable recording medium storing computer-readable instructions for a scanner,
the computer-readable instructions, when executed by a processor of the scanner, causing the scanner to perform:
obtaining a scan request from a terminal device;
after the scan request is obtained, judging whether or not the scan request includes a value indicating a specific resolution,
if it is judged that the scan request includes the value indicating the specific resolution, determining the value indicating the specific resolution as a target scan resolution,
if it is judged that the scan request does not include the value indicating the specific resolution, determining the target scan resolution based on software-related information included in the scan request, the software-related information including a name of a software installed in the terminal device, and the software used by the terminal device for supplying the scan request to the scanner;
generating scan image data having the determined target scan resolution by scanning a document optically; and
supplying the scan image data to the terminal device.

14. A non-transitory computer-readable recording medium storing computer-readable instructions for a scanner,
the computer-readable instructions, when executed by a processor of the scanner, causing the scanner to perform:
obtaining a scan request from a terminal device in accordance with a HTTP (abbreviation of Hyper Text Transfer Protocol);
after the scan request is obtained, judging whether or not the scan request includes a value indicating a specific resolution,
if it is judged that the scan request includes the value indicating the specific resolution, determining the value indicating the specific resolution as a target scan resolution,
if it is judged that the scan request does not include the value indicating the specific resolution, determining the target scan resolution based on information described in a User-Agent area within the scan request;
generating scan image data having the determined target scan resolution by scanning a document optically; and
supplying the scan image data to the terminal device.

* * * * *

UNITED STATES PATENT AND TRADEMARK OFFICE
CERTIFICATE OF CORRECTION

| | |
|---|---|
| PATENT NO. | : 9,591,178 B2 |
| APPLICATION NO. | : 14/753161 |
| DATED | : March 7, 2017 |
| INVENTOR(S) | : Munehisa Matsuda |

Page 1 of 1

It is certified that error appears in the above-identified patent and that said Letters Patent is hereby corrected as shown below:

In the Claims

Claim 11
Column 13, Line 51: Delete "User Agent", and insert -- User-Agent -- therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*